(12) United States Patent
Choi et al.

(10) Patent No.: US 12,289,716 B2
(45) Date of Patent: Apr. 29, 2025

(54) METHOD AND DEVICE FOR TRANSMITTING OR RECEIVING DATA IN WIRELESS COMMUNICATION SYSTEM

(71) Applicant: Samsung Electronics Co., Ltd., Gyeonggi-do (KR)

(72) Inventors: Seunghoon Choi, Gyeonggi-do (KR); Youngbum Kim, Gyeonggi-do (KR); Taehyoung Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 18/626,766

(22) Filed: Apr. 4, 2024

(65) Prior Publication Data

US 2024/0251396 A1    Jul. 25, 2024

Related U.S. Application Data

(63) Continuation of application No. 16/973,954, filed as application No. PCT/KR2019/009681 on Aug. 2, 2019, now Pat. No. 11,979,863.

(30) Foreign Application Priority Data

Aug. 3, 2018    (KR) ........................ 10-2018-0090913

(51) Int. Cl.
*H04W 72/0453*    (2023.01)
*H04W 72/21*    (2023.01)
*H04W 72/23*    (2023.01)

(52) U.S. Cl.
CPC ....... *H04W 72/0453* (2013.01); *H04W 72/21* (2023.01); *H04W 72/23* (2023.01)

(58) Field of Classification Search
CPC . H04W 72/0453; H04W 72/21; H04W 72/23; H04W 72/1268; H04W 74/0866;
(Continued)

(56) References Cited

U.S. PATENT DOCUMENTS 10,349,392 B2    7/2019 Oh et al.
10,749,637 B2    8/2020 Cheng
(Continued)

FOREIGN PATENT DOCUMENTS

KR    10-2018-0046372    5/2018

OTHER PUBLICATIONS

Huawei, HiSilicon, "Initial Access and Uplink Operations with SUL", R1-1712165, 3GPP TSG RAN WG1 Meeting #90, Aug. 21-25, 2017, 6 pages.
(Continued)

*Primary Examiner* — Brian T O Connor
(74) *Attorney, Agent, or Firm* — The Farrell Law Firm, P.C.

(57) ABSTRACT

A user equipment for transmitting and receiving a signal in a wireless communication system may include a transceiver configured to receive, from a base station, downlink control information (DCI), and at least one processor configured to, based on a configuration state of a supplementary uplink (SUL) carrier indicated to the user equipment by the base station, determine whether information indicating activation or inactivation of the SUL carrier is present in the DCI, and based on a result of the determining of whether the information indicating activation or inactivation of the SUL carrier is present, determine a carrier to transmit uplink data scheduled by using the DCI.

12 Claims, 9 Drawing Sheets

(58) Field of Classification Search
CPC ... H04W 72/0413; H04L 5/001; H04L 5/0098
See application file for complete search history.

(56) References Cited

U.S. PATENT DOCUMENTS

| | | |
|---|---|---|
| 10,952,231 B2 | 3/2021 | Liou |
| 11,019,651 B2 | 5/2021 | Karaki |
| 11,695,497 B2 | 7/2023 | Fröberg Olsson |
| 11,979,863 B2 * | 5/2024 | Choi .................... H04W 72/23 |
| 2016/0302225 A1 | 10/2016 | Damnjanovic et al. |
| 2018/0279360 A1 | 9/2018 | Park et al. |
| 2019/0150173 A1 | 5/2019 | Lee |
| 2019/0222361 A1 | 7/2019 | Cheng |
| 2019/0254008 A1 | 8/2019 | Medles |
| 2019/0281588 A1 | 9/2019 | Zhang |
| 2019/0342911 A1 | 11/2019 | Talarico |
| 2020/0323009 A1 | 10/2020 | Jiang |
| 2020/0351950 A1 | 11/2020 | Liu |
| 2020/0396026 A1 | 12/2020 | Chang |
| 2021/0153255 A1 | 5/2021 | Liang |
| 2021/0243677 A1 | 8/2021 | Li |
| 2022/0030599 A1 | 1/2022 | Takeda |

OTHER PUBLICATIONS

Korean Office Action dated Jun. 25, 2024 issued in counterpart application No. 10-2018-0090913, 7 pages.
NTT Docomo, Inc., "Remaining Issues on Other Aspect of Carrier Aggregation", R1-1720826, 3GPP TSG RAN WG1 Meeting 91, Nov. 27-Dec. 1, 2017, 9 pages.
Vivo, CATR, "Remaining Stage-2 Issues of SUL Carrier for EN-DC", R2-1712999, 3GPP TSG-RAN WG2 Meeting #100, Nov. 27-Dec. 1, 2017, 11 pages.
Spreadtrum Communications, "Remaining Issues on BWP", R1-1800283, 3GPP TSG RAN WG1 Meeting AH 1801, Jan. 22-26, 2018, 6 pages.
International Search Report dated Nov. 29, 2019 issued in counterpart application No. PCT/KR2019/009681, 17 pages.

* cited by examiner

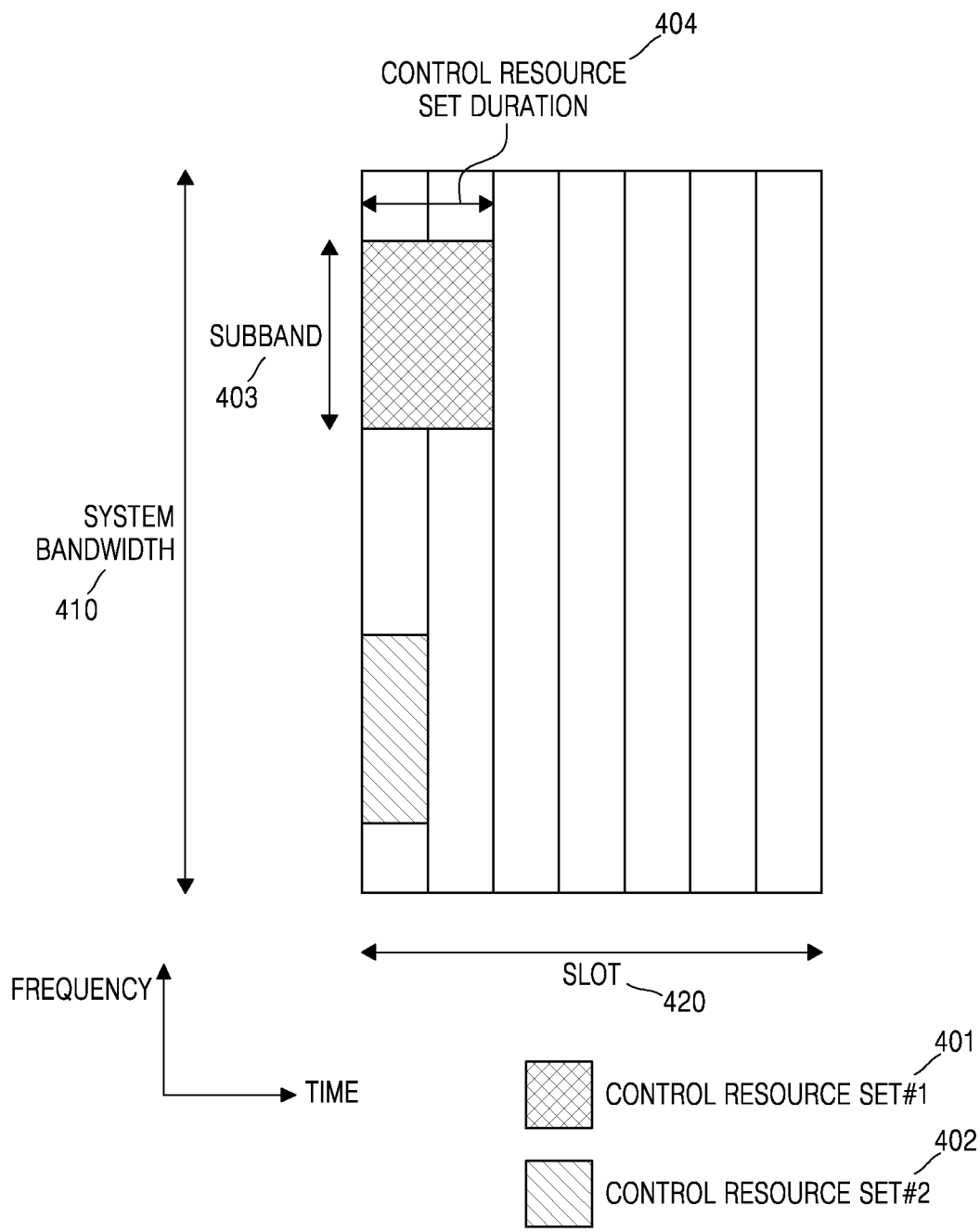

METHOD AND DEVICE FOR TRANSMITTING OR RECEIVING DATA IN WIRELESS COMMUNICATION SYSTEM

PRIORITY

This application is a continuation of U.S. application Ser. No. 16/973,954, which was filed in the U.S. Patent and Trademark Office on Dec. 10, 2020, which is a National Phase Entry of PCT International Application No. PCT/KR2019/009681, which was filed on Aug. 2, 2019, and claims priority to Korean Patent Application No. 10-2018-0090913, which was filed on Aug. 3, 2018, the content of each of which is incorporated herein by reference.

TECHNICAL FIELD

The disclosure relates to a wireless communication system, and in particular, to a method and user equipment for smoothly providing a service in a wireless communication system. More particularly, the disclosure relates to a method and user equipment for transmitting and receiving data in a wireless communication system.

BACKGROUND ART

To meet the increasing demand with respect to wireless data traffic after the commercialization of 4th generation (4G) communication systems, efforts to develop enhanced $5^{th}$ generation (5G) communication systems or pre-5G communication systems are continuing. For this reason, a 5G communication system or pre-5G communication system is called a 'beyond 4G network' communication system or a 'post long term evolution (post-LTE)' system. The 5G communication system prescribed in the $3^{rd}$ Generation Partnership Project (3GPP) is called a new radio (NR) system. To achieve a high data rate, the implementation of a 5G communication system in an ultra-high-frequency (millimeter wave (mmWave)) band (e.g., a 60 GHz band) is being considered. In order to reduce path loss of radio waves and increase a transfer distance of radio waves in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied and applied to the NR system. In order to improve system networks for 5G communication systems, various technologies have been developed, for example, evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation. Furthermore, in 5G communication systems, an advanced coding modulation (ACM) scheme such as hybrid frequency-shift keying (FSK) and quadrature amplitude modulation (QAM) modulation (FQAM) and sliding window superposition coding (SWSC) and an enhanced network access scheme such as filter bank multi carrier (FBMC), non-orthogonal multiple access (NOMA), or sparse code multiple access (SCMA) are being developed.

The Internet has evolved from a human-based connection network, where humans create and consume information, to the Internet of things (IoT), where distributed components such as objects exchange information with each other to process the information. Internet of everything (IoE) technology has emerged, in which the IoT technology is combined with, e.g., technology for processing big data through connection with a cloud server. To implement the IoT, various technological elements such as sensing technology, wired/wireless communication and network infrastructures, service interface technology, and security technology are required, so that, in recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, 5G communication, such as sensor networks, M2M, MTC, etc., has been implemented by a scheme such as beamforming, MIMO, an array antenna, and so forth. Application of cloud radio access network (Cloud-RAN) as the aforementioned big data processing technology may be an example of convergence of 5G communication technology and IoT technology.

As described above, various services may be provided as mobile communication systems develop, and accordingly, methods for effectively providing such services are required.

DESCRIPTION OF EMBODIMENTS

Technical Problem

The embodiments of the disclosure provide a method and user equipment for efficiently providing a service in a mobile communication system.

Technical Solution to Problem

According to an embodiment of the disclosure, a user equipment for transmitting and receiving a signal in a wireless communication system includes a transceiver configured to receive, from a base station, downlink control information (DCI), and at least one processor configured to, based on a configuration state of a supplementary uplink (SUL) carrier indicated to the user equipment by the base station, determine whether information indicating activation or inactivation of the SUL carrier is present in the DCI, and based on a result of the determining of whether the information indicating activation or inactivation of the SUL carrier is present, determine a carrier to transmit uplink data scheduled by using the DCI.

Advantageous Effects of Disclosure

According to embodiments of the disclosure, a service may be effectively provided in a mobile communication system.

BRIEF DESCRIPTION OF THE DRAWINGS

FIG. 4 illustrates transmission resources of a 5G downlink control channel and a 5G downlink data channel, according to an embodiment.

BEST MODE

Figure 1:
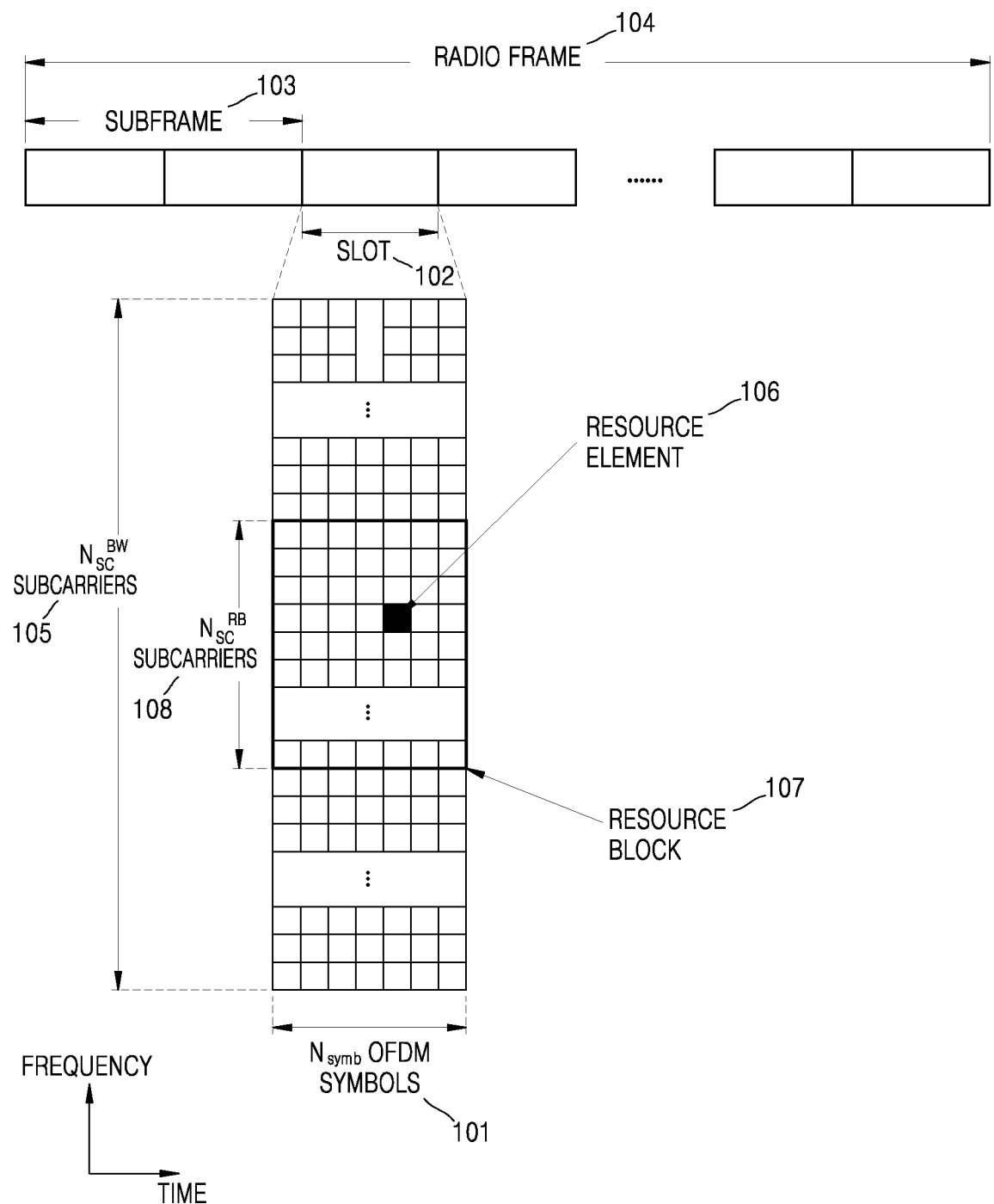
FIG. 1 illustrates a basic structure of a time-frequency domain in a long-term evolution (LTE) system to which an embodiment of the disclosure is applied.

According to an embodiment of the disclosure, a user equipment for transmitting and receiving a signal in a wireless communication system includes a transceiver configured to receive, from a base station, downlink control information (DCI), and at least one processor configured to, based on a configuration state of a supplementary uplink (SUL) carrier indicated to the user equipment by the base station, determine whether information indicating activation or inactivation of the SUL carrier is present in the DCI, and based on a result of the determining of whether the information indicating activation or inactivation of the SUL carrier is present, determine a carrier to transmit uplink data scheduled by using the DCI.

Mode of Disclosure

Hereinafter, embodiments of the disclosure will be described in detail with reference to accompanying drawings. When the embodiments are described, descriptions about technical content well known in the technical field to which the disclosure belongs and not directly related to the disclosure will be omitted. The reason for this is to more clearly convey, without obscuring, the gist of the disclosure by omitting unnecessary descriptions.

For the same reason, some elements of the accompanying drawings may be exaggeratedly shown, omitted, or schematically shown. Also, the sizes of the elements do not completely reflect their actual sizes. In the drawings, the same or corresponding elements are denoted by the same reference numerals.

The advantages and features of the disclosure and methods of achieving them will become apparent with reference to embodiments of the disclosure described in detail below with reference to the accompanying drawings. The disclosure may, however, be embodied in many different forms and should not be construed as limited to embodiments set forth herein. Rather, these embodiments are provided so that this disclosure will be thorough and complete, and will fully convey the scope of the disclosure only defined by the claims to one of ordinary skill in the art. Like reference numerals denote like elements throughout the specification.

It will be understood that each block of flowchart illustrations, and combinations of blocks in the flowchart illustrations, may be implemented by computer program instructions. These computer program instructions may be provided to a processor of a general-purpose computer, a special purpose computer, or other programmable data processing apparatus, so that the instructions, which are executed via the processor of the computer or other programmable data processing apparatus, generate means for performing functions specified in the flowchart block(s). These computer program instructions may also be stored in a computer usable or computer readable memory capable of directing a computer or other programmable data processing equipment to implement the functions in a particular manner so that the instructions stored in the computer usable or computer readable memory are also capable of producing manufacturing items containing instruction means for performing the functions described in the flowchart block(s). The computer program instructions may also be installed on a computer or other programmable data processing equipment so that a series of operating steps may be performed on a computer or other programmable data processing equipment to generate a computer-executable process. Therefore, it is also possible for the instructions to operate the computer or other programmable data processing equipment to provide steps for executing the functions described in the flowchart block(s).

In addition, each block of the flowchart may represent a module, segment, or portion of code that includes one or more executable instructions for executing specified logical function(s). It should also be noted that in some alternative implementations, the functions mentioned in the blocks may occur out of order. For example, two blocks shown in succession may actually be executed substantially concurrently, or the blocks may sometimes be performed in the reverse order depending upon the functionality involved.

Here, the term "unit" in the embodiments means a software component or hardware component such as a Field-Programmable Gate Array (FPGA) or an Application-Specific Integrated Circuit (ASIC), and performs certain tasks. However, the term "unit" is not limited to software or hardware. The "unit" may be configured in an addressable storage medium, or may be configured to operate one or more processors. Therefore, as an example, the "unit" includes: components such as software components, object-oriented software components, class components, and task components; processes, functions, attributes, procedures, sub-routines, segments of program codes, drivers, firmware, microcodes, circuits, data, databases, data structures, tables, arrays, and variables. Functions provided in the components and "units" may be combined into a smaller number of components and "units", or sub-divided into additional components and "units". Also, the components and "units" may be configured to operate one or more central processing units (CPUs) in a device or a security multimedia card. Also, in the embodiments of the disclosure, the "unit" may include one or more processors.

Wireless communication systems have passed initial stages of providing voice-based services, and are being developed to wide-band wireless communication systems of providing high-speed, high-quality packet data services, such as, for example, High Speed Packet Access (HSPA) of the 3GPP, Long-Term Evolution (LTE) or Evolved Universal Terrestrial Radio Access (E-UTRA), LTE-Advanced (LTE-A), LTE-Pro, High Rate Packet Data (HRPD) of the 3GPP2, Ultra Mobile Broadband (UMB), and communication standards of the IEEE 802.16e and the like.

As a representative example of the aforementioned broadband wireless communication system, an LTE system has adopted an Orthogonal Frequency Division Multiplexing (OFDM) scheme in a downlink (DL), and a Single Carrier Frequency Division Multiple Access (SC-FDMA) scheme in an uplink (UL). The UL refers to a radio link through which a terminal (e.g., a user equipment (UE) or a mobile station (MS)) transmits data or a control signal to a base station (BS) (e.g., eNode B), and the DL refers to a radio link through which a BS transmits data or control signals to the terminal. A multiple access scheme normally allocates and operates time-frequency resources in which data or control information is carried for individual users so that the time-frequency resources do not overlap, that is, so that orthogonality is fulfilled, thereby distinguishing data or control information of the individual users from each other.

Because 5G or New Radio (NR) access technology systems that are advanced communication systems after the LTE are required to freely reflect various demands of users and service providers, services that satisfy all the various demands should be supported. Services considered for the 5G or NR systems include enhanced mobile broadband (hereinafter, referred to as eMBB), massive machine-type communication (mMTC), ultra-reliability low-latency communication (URLLC) services, or the like.

The eMBB aims to provide an improved data rate than a data rate supported by the existing LTE, LTE-A, or LTE-Pro. For example, in the 5G or NR systems, the eMBB should be able to provide a peak data rate of 20 Gbps in a DL and a peak data rate of 10 Gbps in an UL at one BS. Also, the 5G or NR systems aim to provide a maximum data rate and simultaneously to provide an increased user-perceived data rate of a UE. In order to satisfy such requirements, there may be a need for an improvement in transmission/reception technology including an improved multiple-input multiple-output (MIMO) transmission technology. Also, the current LTE transmits a signal by using a maximum 20 MHz transmission bandwidth in the 2 GHz band, but the 5G or NR systems use a frequency bandwidth wider than 20 MHz in the 3 GHz to 6 GHz or 6 GHz or more frequency band, thereby satisfying data rates required by the 5G communication.

Simultaneously, the mMTC is being considered to support application services such as Internet of Things (IoT) in the 5G or NR systems. In order to efficiently provide IoT based on the mMTC, access support for a large number of UEs in a cell, improved coverage of UEs, improved battery time, reduced costs of UEs, etc. may be required. The IoT is connected to various sensors and devices to provide a communication function. Therefore, a large number of UEs (for example, 1,000,000 UEs/km$^2$) in a cell need to be supported in the mMTC system. Also, because a UE supporting the mMTC is likely to be located in a shadow area failing to be covered by the cell, such as the basement of a building, due to the characteristics of the service, it may require wider coverage than other services provided by the 5G communication systems. The UE supporting the mMTC should be configured as low-cost UEs and may require a very long battery lifetime because it is difficult to frequently replace the battery of the UE.

The URLLC refers to cellular-based wireless communication services used for mission-critical purposes. For example, services for remote control of robots or machinery, industrial automation, unmanned aerial vehicles, remote health care, emergency alerts, and the like may be included therein. Therefore, the URLLC should provide communications providing ultra-low latency and ultra-high reliability. For example, a service supporting the URLLC needs to satisfy air interface latency that is shorter than 0.5 milliseconds, and also, the service has a requirement of a packet error rate that is equal to or lower than 10$^5$. Thus, for the service supporting the URLLC, the 5G or NR systems should provide a Transmit Time Interval (TTI) smaller than other services and simultaneously has a design requirement for allocating wide resources in a frequency band so as to ensure reliability of a communication link.

The three services, i.e., the eMBB, the URLLC, and the mMTC, of the 5G or NR systems may be multiplexed and transmitted in one system. In this regard, different transmission/reception schemes and different transmission/reception parameters may be used so as to satisfy different requirements of the services.

In the 5G or NR systems, when a UE accesses in a particular frequency band, UL transmission coverage may be limited due to the aforementioned characteristics of the frequency. In an embodiment of the disclosure, information about a supplementary UL (SUL) carrier of a frequency band with excellent UL transmission coverage is transmitted to the UE, and an UL signal is transmitted by using the SUL carrier, and thus the UL transmission coverage may be improved. The SUL carrier may be bundled with a single NR cell to configure one cell, or may be bundled with a supplementary DL (SDL) carrier to configure one cell. In this regard, according to an embodiment of the disclosure, a method of configuring a bit field of a DL control channel according to which scheme is used to configure a cell, and a method of receiving, by the UE, the DL control channel and performing UL data transmission by using a particular UL carrier may be provided.

Hereinafter, a frame structure of LTE and LTE-A systems according to an embodiment of the disclosure will now be described in further detail with reference to drawings.

FIG. 1 illustrates a basic structure of a time-frequency domain in an LTE system to which an embodiment of the disclosure is applied. More particularly, FIG. 1 illustrates a basic structure of a time-frequency domain as a radio resource region in which a data channel or a control channel is transmitted in a DL, in an LTE system to which an embodiment of the disclosure is applied.

In FIG. 1, a horizontal axis represents a time domain, and a vertical axis represents a frequency domain. Referring to FIG. 1, a minimum transmission unit in the time domain may be an Orthogonal Frequency Division Multiplexing (OFDM) symbol, $N_{symb}$ OFDM symbols 101 may configure one slot 102, and two slots may configure one subframe 103. A length of each slot may be 0.5 ms, and a length of each subframe may be 1.0 ms. Also, a radio frame 104 is a time domain unit composed of 10 subframes. A minimum transmission unit in the frequency domain may be subcarrier, and a transmission bandwidth of an entire system may be composed of $N_{BW}$ subcarriers 105 in total. A basic unit of a resource in a time-frequency domain may be a resource element (RE) 106, and may be expressed as an OFDM symbol index and a subcarrier index. A resource block (RB) 107 or a physical resource block (PRB) may be defined as $N_{symb}$ successive OFDM symbols 101 in the time domain and $N_{RB}$ successive subcarriers 108 in the frequency domain. Therefore, one RB 108 may be composed of $N_{symb} \times N_{RB}$ REs 106. In general, a minimum transmission unit of data may be a RB unit. In the LTE system, $N_{symb}=7$ and $N_{RB}=12$, and $N_{BW}$ and $N_{RB}$ may be proportional to a bandwidth of a system transmission band.

Hereinafter, downlink control information (DCI) in the LTE and LTE-A systems to which an embodiment of the disclosure is applied will be described in further detail.

In the LTE system according to the embodiment, scheduling information about DL data or UL data may be transferred from a BS to a UE by using DCI. DCI may be defined in various formats, and a DCI format may be used, the DCI format being determined according to whether the DCI is scheduling information about UL data or scheduling information about DL data, whether the DCI is compact DCI with small-sized control information, whether the DCI applies spatial multiplexing using multiple antennas, whether the DCI is DCI for power control, etc. For example, DCI format 1, which is scheduling control information about DL data, may include at least one of a plurality of pieces of following control information.

Resource allocation type 0/1 flag: indicates whether a resource allocation scheme is Type 0 or Type 1. For Type 0, a resource is allocated in a resource block group (RBG) unit by applying a bitmap scheme thereto. In the LTE system, a basic unit of scheduling is a RB expressed in time and frequency domain resources, and a RBG composed of a plurality of RBs is a basic unit of scheduling for Type 0. Type 1 allows a particular RB in the RBG to be allocated.

Resource block assignment: indicates a RB allocated to data transmission. Representation of a resource is determined according to a system bandwidth and a resource allocation scheme.

Modulation and coding scheme (MCS): indicates a modulation scheme used in data transmission and a size of a transport block (TB) that is data to be transmitted.

HARQ process number: indicates a process number of HARQ.

New data indicator: indicates whether first transmission or re-transmission of HARQ.

Redundancy version: indicates a redundancy version of HARQ.

Transmit power control (TPC) command for Physical Uplink Control Channel (PUCCH): indicates a TPC command with respect to a PUCCH that is UL control channel.

The DCI may be transmitted via a Physical Downlink Control Channel (PDCCH) that is a DL physical control channel or an Enhanced PDCCH (EPDCCH) after passing through a channel coding and modulation process.

A Cyclic Redundancy Check (CRC) may be added to a payload of a DCI message, and the CRC may be scrambled by a Radio Network Temporary Identifier (RNTI) corresponding to an identity of the UE. Different RNTIs may be used according to purposes of the DCI message which are transmission of UE-specific data, a power control command, a random access response, or the like. That is, the RNTI may not be explicitly transmitted but may be transmitted being included in a CRC calculation process. When the UE receives the DCI message transmitted via the PDCCH, the UE may identify the CRC by using the allocated RNTI. As a result of the identifying, when the CRC is correct, the UE may determine that the message is transmitted to the UE.

Figure 2:
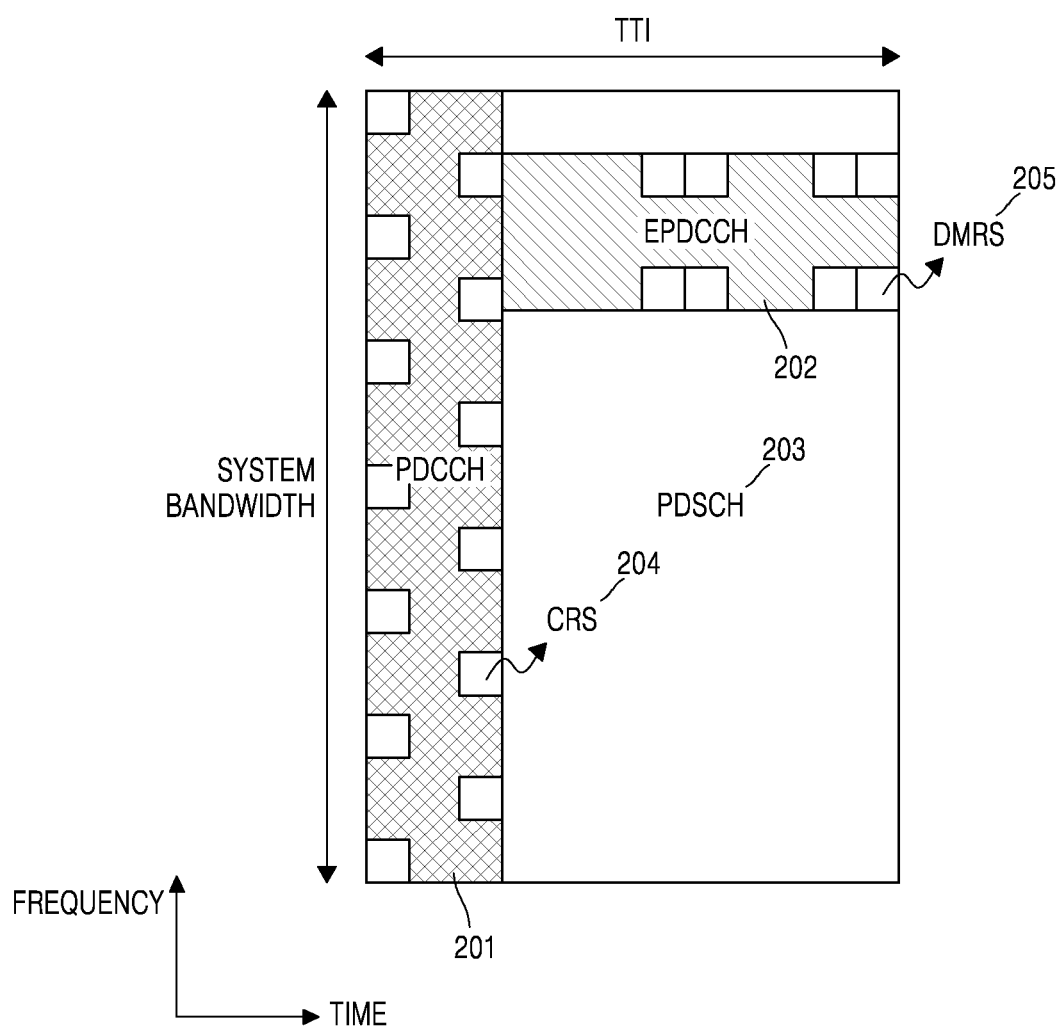
FIG. 2 illustrates transmission resources of a downlink control channel and a downlink data channel in an LTE system to which an embodiment of the disclosure is applied.

FIG. 2 illustrates transmission resources of a DL control channel and a DL data channel in an LTE system to which an embodiment of the disclosure is applied. More particularly, FIG. 2 illustrates a PDCCH 201 and an EPDCCH 202, which are DL physical channels, in an LTE system to which an embodiment of the disclosure is applied.

Referring to FIG. 2, the PDCCH 201 may be time-multiplexed with a Physical Downlink Shared Channel (PDSCH) 203, which is a data transmission channel, and may be transmitted over an entire system bandwidth. A region of the PDCCH 201 is represented as an OFDM symbol number that may be indicated to the UE by using a Control Format Indicator (CFI) transmitted via a Physical Control Format Indicator Channel (PCFICH). Because the PDCCH 201 is allocated to an OFDM symbol located at the front of a subframe, the UE may decode DL scheduling allocation as soon as possible. Also, by doing so, decoding delay, with respect to a Downlink Shared Channel (DL-SCH), i.e., overall DL transmission delay, may be decreased. One PDCCH may transport one DCI message, and because a plurality of UEs may be simultaneously scheduled in a DL and an UL, transmission of a plurality of PDCCHs may simultaneously occur in each cell.

A cell-specific reference signal (CRS) 204 may be used as a reference signal for decoding of the PDCCH 201. The CRS 204 may be transmitted via every subframe over an entire band, and scrambling and resource mapping therefor may vary according to cell identities (IDs). The CRS 204 is a reference signal to be commonly used by all UEs, and thus UE-specific beamforming cannot be used therefor. Therefore, a multi-antenna transmission technique for a PDCCH of the LTE may be limited to open-loop transmit diversity. The number of ports of a CRS may be implicitly indicated to the UE via decoding of a Physical Broadcast Channel (PBCH).

Resource allocation of the PDCCH 201 may be based on Control-Channel Elements (CCEs). In an embodiment, one CCE may be composed of 9 Resource Element Groups (REGs), that is, 36 Resource Elements (REs) in total. A CCE number for the particular PDCCH 201 may be 1, 2, 4, or 8, and may vary according to a channel coding rate of a payload of a DCI message. As such, different CCE numbers may be used to implement link adaptation of the PDCCH 201.

The UE may need to detect a signal without having information about the PDCCH 201. In the LTE system according to the embodiment, a search space indicating a set of CCEs may be defined for blind decoding. The search space is configured as a plurality of sets in an Aggregation Level (AL) of each CCE, and may not be explicitly signaled but may be implicitly defined via a function and a subframe number according to an ID of the UE. In each subframe, the UE may perform decoding on the PDCCH 201 with respect to all available resource candidate sets that may be generated from CCEs in a configured search space, and may process information declared to be valid to the UE via CRC identification.

The search space may be classified to a UE-specific search space and a common search space. UEs in a certain set or all UEs may detect a common search space of the PDCCH 201 so as to receive cell-common control information such as dynamic scheduling about system information or a paging message. For example, the UEs may receive scheduling allocation information of a DL-SCH for transmission of System Information Block (SIB)-1 including business information of a cell by detecting the common search space of the PDCCH 201.

Referring to FIG. 2, the EPDCCH 202 may be frequency-multiplexed with the PDSCH 203 and be transmitted. A BS may appropriately allocate resources of the EPDCCH 202 and the PDSCH 203 via scheduling, and thus may effectively support existence with data transmission for a legacy LTE terminal (or user equipment). However, because the EPDCCH 202 is allocated to one entire subframe at a time axis and then is transmitted, there may be a problem of damage in a transmission delay time. A plurality of EPDCCHs 202 constitute one set of EPDCCH 202, and allocation of the set of EPDCCHs 202 is performed in a PRB pair. Position information about the set of EPDCCHs 202 is configured to be UE-specific and is signaled via Radio Resource Control (RRC). Maximum two sets of EPDCCHs 202 may be configured for each UE, and one set of EPDCCHs 202 may be multiplexed and simultaneously configured for different UEs.

Resource allocation of the EPDCCHs 202 may be based on Enhanced CCE (ECCE), and one ECCE may be composed of 4 or 8 Enhanced REGs (EREGs). The number of EREGs per one ECCE may vary according to a cyclic prefix (CP) and subframe configuration information. In an embodiment, one EREG may be composed of 9 REs, and thus 16 EREGs may be present per a PRB pair. An EPDCCH transmission scheme may be classified into localized and distributed transmissions according to mapping methods for REs of an EREG. An aggregation level (AL) of an ECCE may be 1, 2, 4, 8, 16, or 32, and may be determined based on a CP length, a subframe configuration, an EPDCCH format, and a transmission scheme.

The EPDCCH 202 may support only a UE-specific search space. Therefore, a UE attempting to receive a system message must monitor a common search space on the existing PDCCH 201.

A Demodulation Reference Signal (DMRS) 205 may be used as a reference signal for decoding of the EPDCCH 202. Therefore, a BS may configure precoding with respect to the EPDCCH 202, and in this case, may use UE-specific beamforming. Even when UEs do not know which precoding has been used, the UEs may perform decoding on the EPDCCH 202, according to the DMRS 205. The EPDCCH 202 uses a same pattern as a DMRS of the PDSCH 203. However, unlike to the PDSCH 203, the DMRS 205 in the EPDCCH 202 may support transmission using maximum 4 antenna ports. The DMRS 205 is transmitted only in a PRB where an EPDCCH is transmitted.

Port configuration information of the DMRS 205 may vary according to a transmission scheme of the EPDCCH 202. In an embodiment, in the localized transmission scheme, an antenna port corresponding to an ECCE to which the EPDCCH 202 is mapped may be selected based on an ID of a UE. When different UEs share a same ECCE, i.e., when multi-user MIMO transmission is used, DMRS antenna ports may be allocated to the UEs, respectively. Alternatively, transmission may be performed by sharing the DMRS 205, and in this case, the DMRS 205 may be identified by scrambling sequences configured via higher layer signaling. In the distributed transmission scheme, maximum two antenna ports may be supported for the DMRS 205, and a diversity technique of a precoder cycling scheme may be supported. The DMRS 205 may be shared in all REs transmitted in one PRB pair.

In the LTE system according to an embodiment, an entire PDCCH region may be composed of a set of CCEs in a logical domain, and may have a search space including a set of CCEs. The search space may be classified into a common search space and a UE-specific search space, and a search space with respect to a PDCCH in the LTE may be defined as shown in [Table 1] below.

TABLE 1

The set of PDCCH candidates to monitor are defined in terms of search spaces, where a search space $S_k^{(L)}$ at aggregation level L ∈ {1, 2, 4, 8} is defined by a set of PDCCH candidates. For each serving cell on which PDCCH is monitored, the CCEs corresponding to PDCCH candidate m of the search space $S_k^{(L)}$ are given by
L {($Y_k$ + m')mod $\lfloor N_{CCE,k}/L \rfloor$} + i
where $Y_k$ is defined below, i = 0, . . . , L − 1. For the common search space m' = m . For the PDCCH UE specific search space, for the serving cell on which PDCCH is monitored, if the monitoring UE is configured with carrier indicator field then m' = m + $M^{(L)} \cdot n_{CI}$ where $n_{CI}$ is the carrier indicator field value, else if the monitoring UE is not configured with
carrier indicator field then m' = m, where m = 0, . . . , $M^{(L)}$ − 1. $M^{(L)}$ is the number of PDCCH candidates to monitor in the given search space.
Note that the carrier indicator field value is the same as ServCellIndex
For the common search spaces, $Y_k$ is set to 0 for the two aggregation levels L = 4 and L = 8.
For the UE-specific search space $S_k^{(L)}$ at aggregation level L, the variable $Y_k$ is defined by
$Y_k$ = (A · $Y_{k-1}$)modD
where $Y_{-1}$ = $n_{RNTI}$ ≠ 0, A = 39827, D = 65537 and k = $\lfloor n_s/2 \rfloor$, $n_s$ is the slot number within a
radio frame.
The RNTI value used for $n_{RNTI}$ is defined in subclause 7.1 in downlink and subclause 8 in uplink.

According to the definition of a search space with respect to the PDCCH described above, the UE-specific search space may not be explicitly signaled but may be implicitly defined via a function and a subframe number according to an ID of a UE. In other words, because the UE-specific search space is changeable according to a subframe number, this may mean that the UE-specific search space is changeable over time. Also, by using this, a problem (hereinafter, it is defined as a blocking problem) in which a particular UE among UEs cannot use a search space due to other UEs may be solved.

In an embodiment, in a case where a certain UE cannot be scheduled in a certain subframe because other UEs scheduled in the certain subframe already use all CCEs monitored by the certain UE, because such a search space is changed over time, the problem may not occur in a next subframe. For example, even when a part of a UE-specific search space overlaps in UE #1 and UE #2 in a particular subframe, because a UE-specific search space is changed according to each subframe, it is possible to predict that an overlap in a next subframe may be different.

According to the definition of a search space with respect to the PDCCH described above, in a case of a common search space, UEs in a certain set or all UEs have to receive a PDCCH, and thus the common search space may be defined as a predefined set of CCEs. In other words, the common search space may not be changed according to an ID of a UE or a subframe number. Even though the common search space exists for transmission of various system messages, the common search space may be used to transmit control information of each UE. By doing so, the common search space may be even used as a solution for a problem in which a UE cannot be scheduled due to shortage of available resources in a UE-specific search space.

A search space corresponds to a set of candidate control channels composed of CCEs for which a UE has to attempt to decode on a given AL. Because there are various ALs in which 1, 2, 4, or 8 CCEs constitute one set, a UE may have a plurality of search spaces. In a PDCCH in the LTE, the number of PDCCH candidates to be monitored by a UE in a search space defined according to an AL may be defined as shown in [Table 2] below.

TABLE 2

| Type | Search space $S_k^{(L)}$ | | Number of PDCCH candidates $M^{(L)}$ |
|---|---|---|---|
| | Aggregation level $L$ | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

According to [Table 2], in a UE-specific search space, ALs {1, 2, 4, 8} may be supported and may have {6, 6, 2, 2} PDCCH candidates, respectively. In a common search space 302, ALs {4, 8} may be supported and in this case, may have {4, 2} PDCCH candidates, respectively. The reason why the common search space supports only ALs {4, 8} is to improve a coverage feature because, in general, a system message has to reach a cell boundary.

DCI transmitted in a common search space may be defined only for a particular DCI format such as 0/1A/3/3A/1C that correspond to purposes including a system message or power control with respect to a UE group. The common search space may not support a DCI format having spatial multiplexing. A DL DCI format to be decoded in a UE-specific search space may vary according to a transmission mode configured for a certain UE. Configuration of the transmission mode is performed via RRC signaling, and thus an exact subframe number may not be defined with respect to whether the configuration is effective for the certain UE. Therefore, regardless of the transmission mode, the certain UE may constantly perform decoding on DCI format 1A so as not to lose communication.

The methods of transmitting and receiving a DL control channel and DCI in LTE and LTE-A systems, and the search space have been described above. Hereinafter, a DL control channel in 5G or NR systems will be described in further detail with reference to the drawings.

Figure 3:
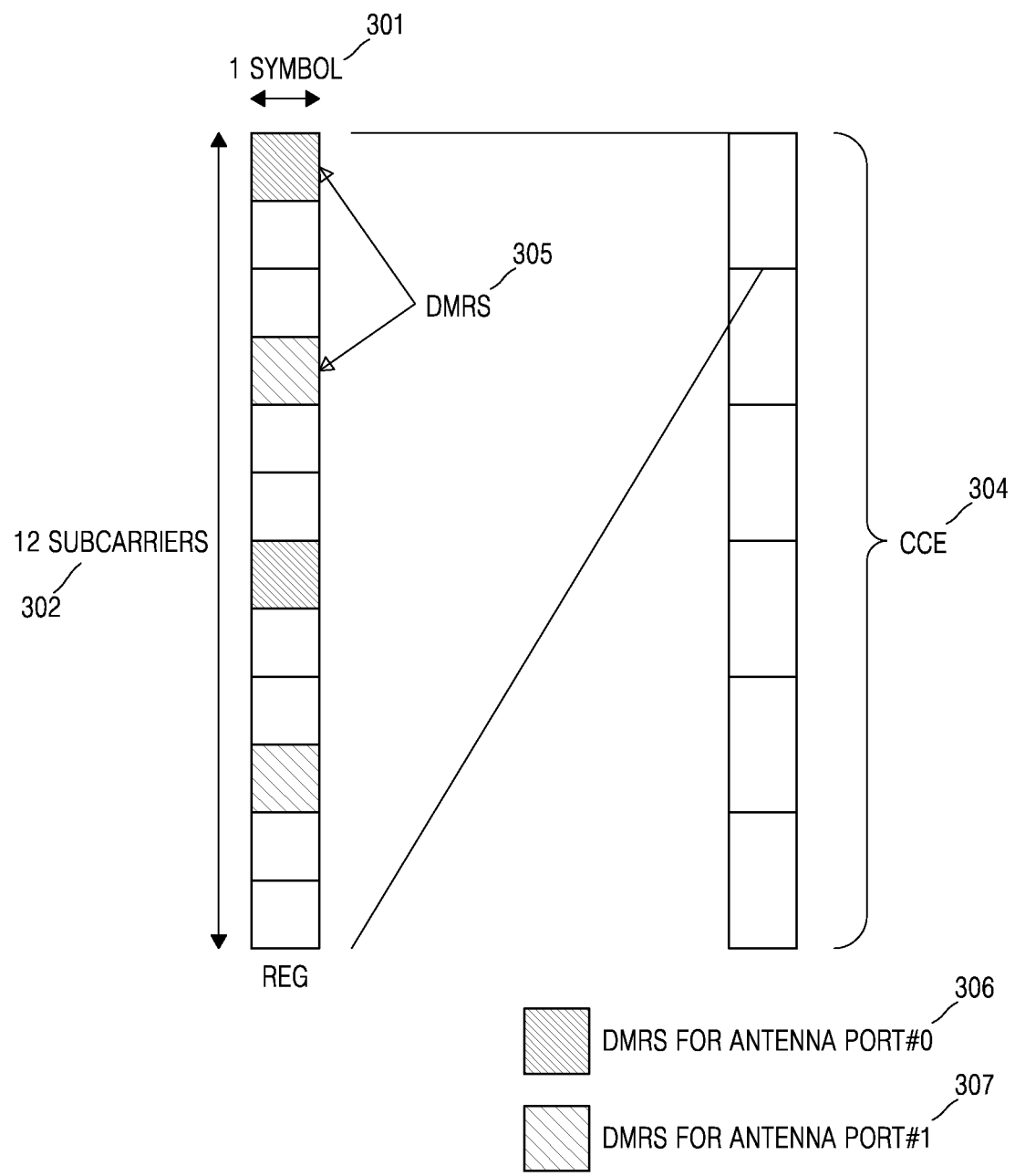
FIG. 3 illustrates a transmission resource of a 5$^{th}$ generation (5G) downlink control channel, according to an embodiment.

FIG. 3 illustrates a transmission resource of a DL control channel of 5G or NR systems, according to an embodiment. More particularly, FIG. 3 illustrates an embodiment of a basic unit of time and frequency resources constituting a DL control channel that may be used in the 5G or NR systems.

Referring to FIG. 3, a basic unit (REG) of time and frequency resources constituting a control channel is composed of one OFDM symbol 301 at a time axis and are 12 subcarriers 302, i.e., one RB, at a frequency axis. In an embodiment, when configuring a basic unit of a control channel, a basic unit at a time axis is assumed to be one OFDM symbol 301, and thus a data channel and a control channel may be time-multiplexed within one subframe. Because the control channel is located before the data channel, a processing time of a user may be decreased so that it is easier to satisfy delay time requirements. A basic unit at a frequency axis of the control channel is configured to be one RB 302, and thus frequency multiplexing between the control channel and the data channel may be further efficiently performed.

Referring to FIG. 3, by concatenating a REG 303, control channel regions having various sizes may be configured. As an embodiment, in a case where a basic unit to which a DL control channel is allocated is a CCE 304, one CCE 304 may be composed of a plurality of REGs 303. Describing the REG 303 shown in FIG. 3 as an example, the REGs 303 may be composed of 12 REs. Accordingly, in a case where one CCE 304 is composed of 6 REGs 303, this means that one CCE 304 may be composed of 72 REs.

When a DL control resource set (CORESET) is configured, the CORESET may be composed of a plurality of CCEs 304, and a particular DL control channel may be mapped to one or more CCEs 304 according to an AL in the CORESET and be transmitted. The CCEs 304 in the CORESET are identified by numbers, and in this regard, the numbers may be allocated according to a logical mapping scheme.

In an embodiment, the basic unit of the DL control channel shown in FIG. 3, i.e., the REG 303, may include all regions where REs to which DCI is mapped and DMRSs 305 that are reference signals for decoding them are mapped. The DMRSs 305 may be mapped in consideration of the number of antenna ports used to transmit a DL control channel, and then transmitted.

In FIG. 3, two antenna ports are used, as an example. In this regard, a DMRS 306 transmitted for antenna port #0 and a DMRS 307 transmitted for antenna port #1 may be present. DMRSs for different antenna ports may be multiplexed in various schemes. In an embodiment, in FIG. 3, as an example, DMRSs corresponding to different antenna ports are respectively transmitted orthogonally in different REs. As such, DMRSs may be frequency-division multiplexed and then transmitted, or may be code-division multiplexed and then transmitted. In addition, various types of DMRS patterns may be present, and this may be related to the number of antenna ports.

FIG. 4 illustrates transmission resources of a 5G DL control channel and a 5G DL data channel, according to an embodiment. More particularly, FIG. 4 illustrates a CORESET through which a DL control channel is transmitted in 5G or NR wireless communication systems, according to an embodiment.

Referring to FIG. 4, as an example, two CORESETs, which are CORESET #1 401 and CORESET #2 402, are configured within a system bandwidth 410 at a frequency axis and one slot 420 at a time axis (in the embodiment of FIG. 4, one slot is assumed to be 7 OFDM symbols). The CORESETs 401 and 402 may be configured with a particular subband 403 in an entire system bandwidth 410 at the frequency axis. The CORESETs 401 and 402 may be configured with one or a plurality of OFDM symbols at the time axis, and this may be defined as a CORESET duration 404. In FIG. 4, as an example, the CORESET #1 401 is configured with a CORESET duration of two symbols, and the CORESET #2 402 is configured with a CORESET duration of one symbol.

The CORESETs in the 5G system described above may be configured via higher layer signaling (e.g., system information, master information block (MIB), RRC signaling, etc.), which is provided by a BS to a UE. Configuring, by the BS, a CORESET to the UE may mean that information such as a location of the CORESET, a subband, resource allocation of the CORESET, a CORESET duration, or the like, is provided. In an embodiment, CORESET configuration may include information as shown in [Table 4] below.

TABLE 3

Configuration Information 1. Frequency-axis RB allocation information
Configuration Information 2. CORESET start symbol
Configuration Information 3. CORESET symbol duration
Configuration Information 4. REG bundling size
Configuration Information 5. Transmission mode
(Interleaved transmission scheme or Non-interleaved transmission scheme)
Configuration Information 6. Search space type
(Common search space, group-common search space, UE-specific search space)
Configuration Information 7. Monitoring period
Others In an embodiment, various information as well as the configuration information necessary for transmission of a DL control channel may be configured in a UE.

Transmission/reception of a DL data channel are possible in a region where a DL control channel is present in a CORESET, or a remaining time-frequency domain except for CORESETs. Medium access control (MAC) control elements (CEs) described in the disclosure may be transmitted from a BS to a UE via a DL data channel, and the UE may receive the aforementioned MAC CEs via the DL data channel.

Figure 5A:
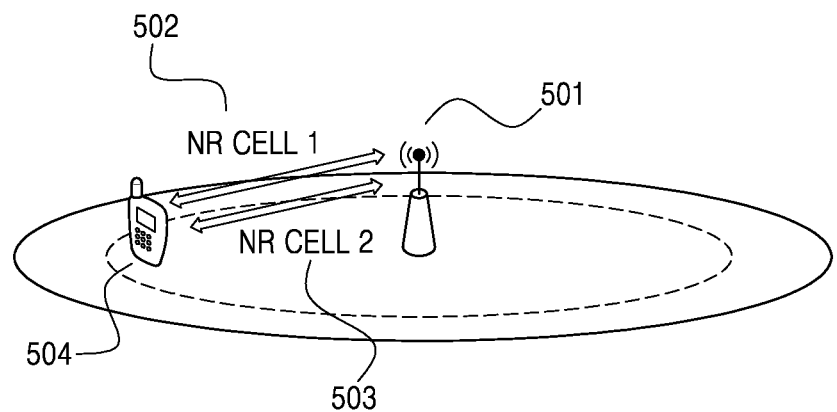
FIG. 5A is a diagram for describing a case where a plurality of cells coexist in a small base station in a network to which an embodiment of the disclosure is applied.
Figure 5B:
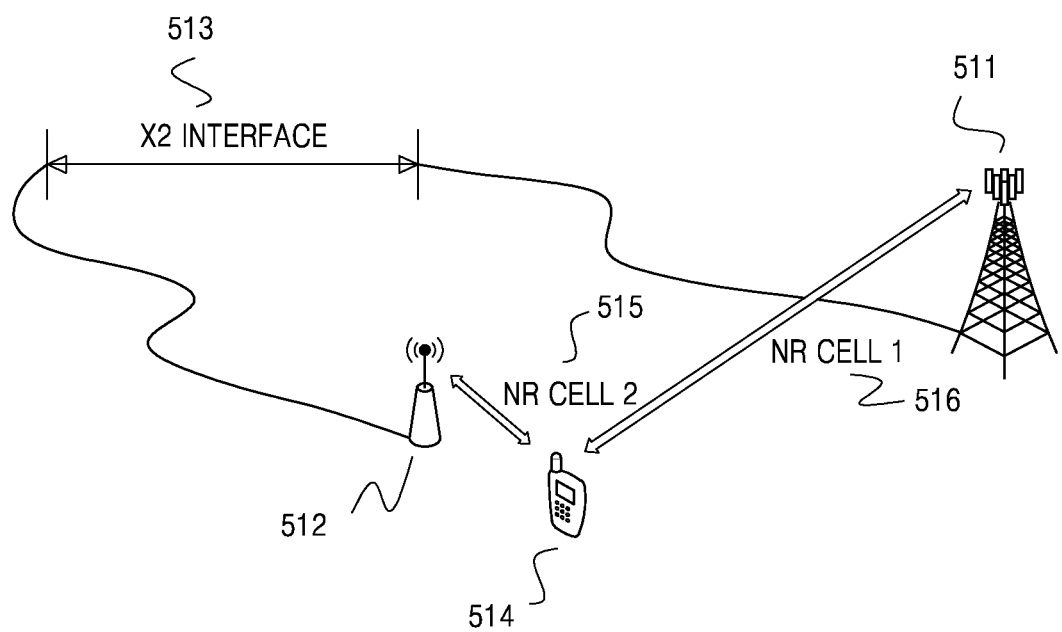
FIG. 5B is a diagram for describing a case where a macro base station and a small base station are provided in a network to which an embodiment of the disclosure is applied.

FIGS. 5A and 5B illustrate embodiments of a communication system to which the disclosure is applied, respectively.

FIG. 5A illustrates a case where an NR cell 1 502 and an NR cell 2 503 coexist in a small BS 501. Referring to FIG. 5A, a UE 504 transmits and receives data to and from the small BS 501 by using the NR cell 1 502 and the NR cell 2 503. In this case, there may be no restrictions on duplexing schemes of the NR cell 1 502 and the NR cell 2 503, or whether a licensed spectrum or an unlicensed spectrum is used. However, when the NR cell 1 502 is a primary cell (P cell), UL transmission may only be performed by using the NR cell 1 502. The UE 504 may perform UL transmission by using two different cells. When the UE 504 receives a higher layer signal from the small BS 501 so that UL transmission is also performed by using the NR cell 2 503, UL transmission may be performed by using the NR cell 1 502 and the NR cell 2 503.

FIG. 5B illustrates a case where a macro BS 511 for wider coverage and a transmission reception point (TRP) or a small BS 512 for increasing the amount of data transmission are installed in a network. There may be no restrictions on duplexing schemes of the macro BS 511, the TRP, or the small BS 512, or whether a licensed spectrum or an unlicensed spectrum is used. However, when the macro BS 511 is a P cell, UL transmission may be performed only via the macro BS 511.

In this regard, it may be assumed that the macro BS 511, and the TRP or the small BS 512 have an ideal backhaul network. Accordingly, rapid X2 communication 513 is allowed between BSs, and thus even when UL transmission is performed only via the macro BS 511, the TRP or the small BS 512 may receive, via the X2 communication 513, related control information from the macro BS 511 in real time. A UE 514 may perform UL transmission by using two different cells. When the UE 514 receives a higher layer signal from the macro BS 511 so that UL transmission is also performed via the TRP or the small BS 512, UL transmission may be performed via the macro BS 511, and the TRP or the small BS 512. In this regard, it may be assumed that the macro BS 511, and the TRP or the small BS 512 have a non-ideal backhaul network, and transmission/reception between a BS and a UE may be performed.

In the systems of FIGS. 5A and 5B described above, the NR cell 1 502 and the NR cell 2 503, or the macro BS 511, and the TRP or the small BS 512 may have a plurality of serving cells, and may support 32 serving cells in total. Therefore, methods proposed in the disclosure may be applied to both of the systems of FIGS. 5A and 5B.

Hereinafter, a description will be provided of how DL carriers and UL carriers are composed of and configured in a UE, in carrier aggregation (CA).

Figure 6:
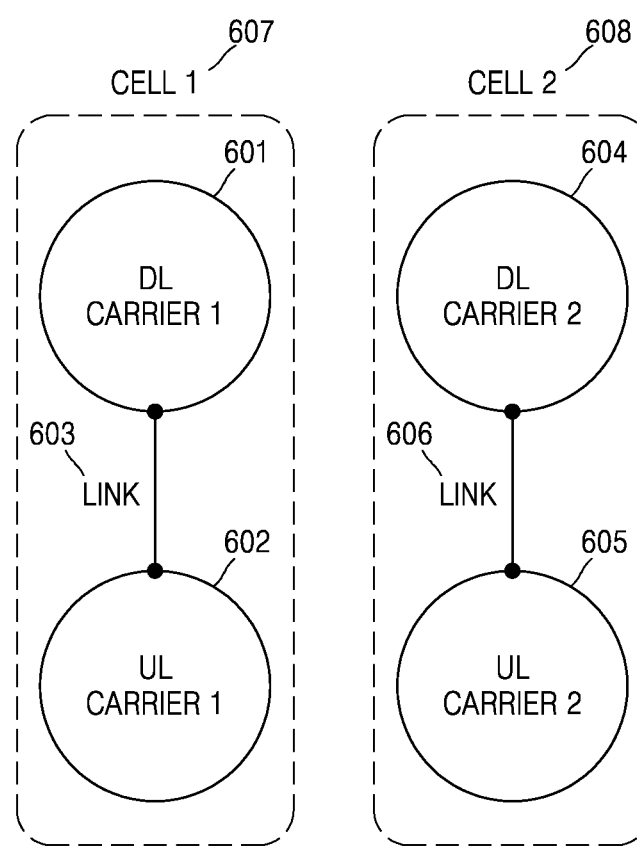
FIG. 6 illustrates 5G carrier aggregation according to an embodiment.

FIG. 6 illustrates 5G or NR CA according to an embodiment.

In 3GPP LTE Rel-10, bandwidth extension technology was adopted to support a higher amount of data transmission compared to LTE Rel-8. The bandwidth extension technology, also called as CA, was able to extend bands and increase the amount of data transmission by the extended bands, compared to LTE Rel-8 UEs that transmit data in one band.

Even in a 5G system, CA may be supported for NR carriers. Each of the aforementioned bands for supporting CA is called a component carrier (CC). In general, an NR terminal (or user equipment) is configured to have one DL CC and one UL CC. Also, a DL CC and an UL CC linked (referred to as SIB link herein) as information descended from system information are bundled together and called a cell. Referring to FIG. 6, a DL CC 1 601 is bundled with an UL CC 1 602 via an SIB link 603 to configure a cell 1 607, and a DL CC 2 604 is bundled with an UL CC 2 605 via an SIB link 606 to configure a cell 2 608.

An SIB link relationship between the DL CC and the UL CC may be transmitted as a cell common signal or a UE-specific signal, and then received by a UE. A UE that supports CA may receive DL data by using a plurality of serving cells and may also transmit UL data.

When it is difficult for a BS to transmit a PDCCH from a particular serving cell to a particular UE, as a field indicating that the PDCCH is transmitted from another serving cell, and the PDCCH indicates a PDSCH or a Physical Uplink Shared Channel (PUSCH) of the other serving cell, a carrier indicator field (CIF) may be configured as a higher layer signal. The UE may determine that the CIF is included in information bits of PDCCH, by receiving the aforementioned higher layer signal.

It may be determined that the CIF indicates another serving cell by adding 3 bits to the PDCCH information in a particular serving cell. It may be defined that, when the CIF is included in DL assignment, the CIF indicates a serving cell to which a PDSCH scheduled by the DL assignment is to be transmitted, and when the CIF is included in UL resource assignment information (UL grant), the CIF indicates a serving cell to which a PUSCH scheduled by the UL grant is to be transmitted.

For a cell to which a PDSCH or a PUSCH is transmitted, mapping between the CIF and a cell index of a cell to which a PDCCH is transmitted or between the CIF and a cell index of the cell to which the PDSCH or the PUSCH is transmitted may be transmitted as a higher layer signal in advance, and the UE may receive the higher layer signal. That is, the UE may receive the higher layer signal described above, and a PDCCH for the cell to which the PDSCH or the PUSCH is transmitted may be monitored in a cell to which the PDCCH indicated by the higher layer signal is transmitted. The UE may determine a PDSCH transmission cell and a PUSCH transmission cell indicated by a value of a CIF included in a particular PDCCH received from the cell to which the PDCCH is transmitted, and a value of the aforementioned CIF received via the aforementioned higher layer signal. In the NR system, a maximum of 16 or 32 serving cell configuration scenarios are assumed.

Figure 7:
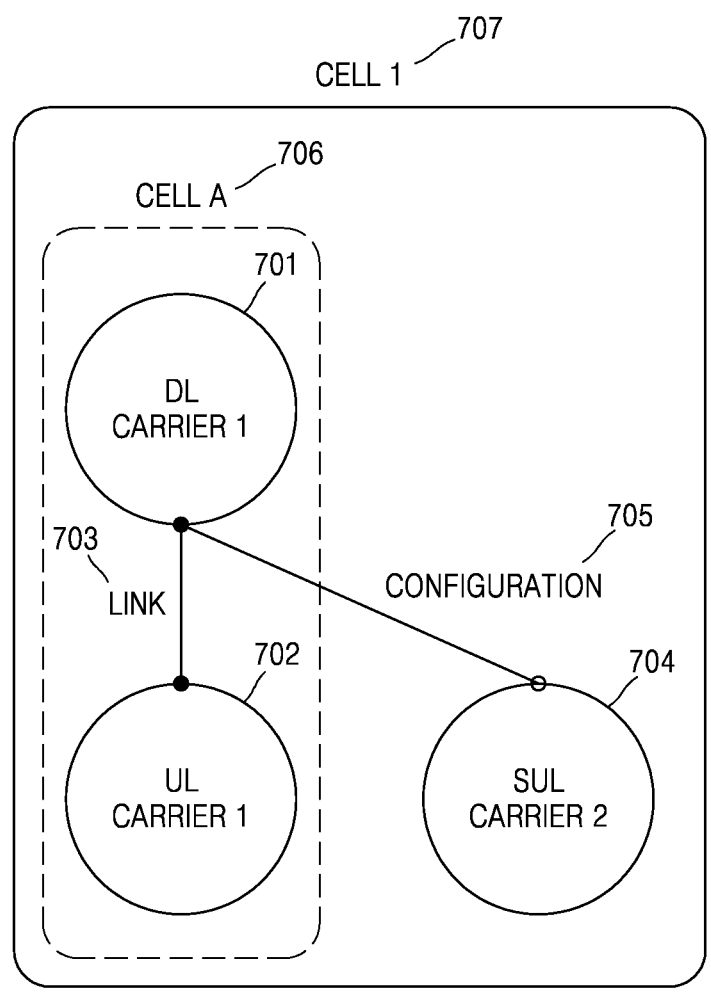
FIG. 7 is a diagram for describing that a supplementary uplink carrier is configured in 5G uplink/downlink carriers, according to an embodiment.

Hereinafter, it will be described with reference to FIG. 7 that a SUL carrier (also referred to as a supplementary UL CC) is additionally configured in 5G UL/DL carriers. FIG. 7 illustrates that the SUL carrier is configured in an NR cell composed of 5G UL/DL carriers, according to an embodiment.

Referring to FIG. 7, a DL CC 1 701 is bundled with an UL CC 1 702 via an SIB link 703 to configure a cell A 706. In this regard, when the cell A 706 is located in a frequency band such as 3.5 GHz, there may be a problem that UL transmission coverage of a UE is reduced due to the characteristics of the frequency band such as 3.5 GHz. Also, considering a situation in which the frequency of 3.5 GHz is mainly operated by time division duplex (TDD) that distinguishably uses a DL slot and an UL slot in terms of time, when there is no available UL slot to transmit HARQ-ACK feedback, a problem of feedback delay may occur. In order to solve these problems, an UL carrier of a low frequency band such as 700 MHz or 1.8 GHz may be additionally configured in the cell A 706, and the UL carrier of the low frequency band may be configured to be used by a UE. Referring to FIG. 7, an embodiment is shown in which, in a cell A 706, a SUL carrier 2 704 is configured 705 to be connected to the DL CC 1 701, and is included in a cell 1 707. Although it has been described in the disclosure by distinguishing the cell A 706 and the cell 1 707 according to the presence of the SUL carrier 2 704 for convenience of description, only the cell 1 707 including the SUL carrier 2 704 may be recognized by the UE as one cell.

In this case, in ServingCellConfigCommon that is an RRC signal, uplinkConfigCommon may be used to configure cell common information of the UL CC 1 702, and supplementaryUplinkConfig may be used to configure cell common information of the SUL carrier 2 704. The cell common information may include information such as a band number of the SUL carrier 2 704. Also, in ServingCellConfig, uplinkConfig may be used to configure UE-specific information of the UL CC 1 702, and supplementaryUplink may be used to configure UE-specific information of the SUL carrier 2 704. The UE may receive configuration information of the cell 1 707 by using the RRC signals described above.

Hereinafter, a method for additionally configuring a SUL carrier to an NR cell and performing initial random access, and a method for configuring information about the SUL carrier for data transmission/reception, and transmitting a PUSCH via the SUL carrier will be described.

First, in order to perform initial random access in the SUL carrier 2 704, in the DL CC 1 701 of the cell 1 707, a BS may transmit, to a UE, Random Access Channel (RACH) configuration information in the SUL carrier 2 704 by using a cell common signal. The UE may receive the RACH configuration information in the SUL carrier 2 704 by using the cell common signal in the DL CC 1 701 of the cell 1 707.

The RACH configuration information may include frequency location information of a SUL carrier, band information, time and frequency information for transmission of a random preamble, random preamble sequence information, a threshold for selection of a SUL carrier, etc. The UE may measure a Reference Signal Received Power (RSRP) in the DL CC 1 701 of the cell 1 707, compares the measured RSRP with the threshold for selection of the SUL carrier 2 704, included in the RACH configuration information, and only when the measured RSRP is smaller than the threshold, perform random access in the SUL carrier 2 704. When the measured RSRP is greater than the threshold, the UE may perform random access in the UL CC 1 702 of the cell 1 707. The reason for comparing with the threshold through the RSRP measurement is that, in the case of TDD, the coverage of the UL CC 1 702 may be determined by measuring RSRP in the DL CC 1 701 using reciprocity between a DL CC and an UL CC. Therefore, when an RSRP value is smaller than the threshold, it may be determined that the coverage of the UL CC 1 702 is small, and thus the UE may perform random access by using the SUL carrier 2 704. Performing, by the UE, initial random access by using the SUL carrier 2 704 may include transmitting, by the UE, a random access preamble at a particular time and frequency resource of the SUL carrier 2 704 by using the frequency location information of the SUL carrier, the band information, the time and frequency information for transmission of the random preamble, etc., which are included in the aforementioned RACH configuration information, and completing UL transmission required for a random access procedure in the SUL carrier 2 704.

After the UE completes the random access procedure in the SUL carrier 2 704, the UE may additionally receive, from the BS, a higher layer signal including configuration information about the SUL carrier. The configuration information about the SUL carrier may include higher layer information required for data transmission/reception in the SUL carrier. For example, the configuration information may include time and frequency resource information for each transmission PUCCH format for UL control channel transmission, sequence/frequency hopping information, power control information, frequency hopping information for UL data channel transmission, and other configuration information.

After the UE completes reception of the configuration information about the SUL carrier, the UE may receive, from the BS, a higher layer signal (pucch-Config) including a configuration about whether to transmit a PUCCH by using the UL CC 1 702 or the SUL carrier 2 704. The UE may transmit a PUSCH by using a carrier by which the PUCCH is determined to be transmitted.

The UE may additionally receive, from the BS, a higher layer signal (pusch-Config) including a configuration so that whether to transmit the PUSCH by using the UL CC 1 702 or the SUL carrier 2 704 may be dynamically scheduled. In this regard, a UL/SUL indicator field included in DCI format 0_0 or DCI format 0_1 indicates whether to transmit the PUSCH by using the UL CC 1 702 or the SUL carrier 2 704, and the UE may transmit the PUSCH by using the UL CC 1 702 or the SUL carrier 2 704 according to a value of the field described above. A mapping relationship between the value of the field described above and the UL CC 1 702 or the SUL carrier 2 704 may be defined in the standards so that, when the field value is 0, the UE indicates the UL CC 1 702 to transmit the PUSCH, and when the field value is 1, the UE indicates the SUL carrier 2 704 to transmit the PUSCH.

Hereinafter, it will be described with reference to FIG. 8 that a SDL carrier (also referred to as a supplementary DL CC) and the SUL carrier configure one cell.

Figure 8:
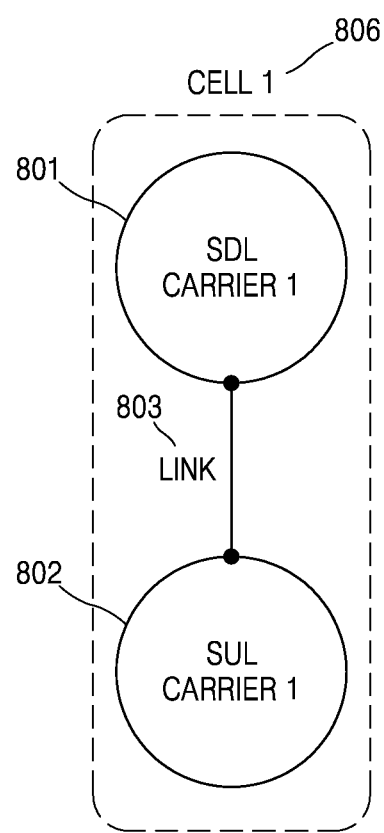
FIG. 8 is a diagram for describing that a 5G supplementary downlink carrier and a 5G supplementary uplink carrier configure one cell, according to an embodiment.

FIG. 8 is a diagram for describing that a 5G SDL carrier and a 5G SUL carrier configure one cell, according to an embodiment. Referring to FIG. 8, a SDL carrier 1 801 is bundled with a SUL carrier 1 802 via an SIB link 803 to configure a cell 1 806. In this regard, the aforementioned cell 1 806 may be configured by combining the SDL carrier 1 801 for use in large-capacity DL data using a wide frequency band in a frequency band such as mmWave with the SUL carrier 1 802 of a low frequency band such as 700 MHz or 1.8 GHz to solve the problems regarding UL transmission coverage and HARQ-ACK feedback delay of the UE.

In this case, in ServingCellConfigCommon that is an RRC signal, downlinkConfigCommon is used to configure cell common information of the SDL carrier 1 801, and uplinkConfigCommon is used to configure cell common information of the SUL carrier 1 802. The aforementioned cell common information may include information such as a band number of the SDL carrier 1 801 and information such as a band number of the SUL carrier 1 802. Also, uplinkConfig in ServingCellConfig is used to configure UE-specific information of the SUL carrier 1 802. The UE may receive configuration information of the cell 1 806 by using the RRC signals.

Hereinafter, a method of determining the presence of a bit field of a UL/SUL indicator of a UE in DCI format 0_0 and DCI format 0_1, which are UL DCI formats for scheduling a PUSCH, will be described in first and second embodiments. More particularly, a method of determining the presence of a bit field of a UL/SUL indicator for indicating whether to transmit a PUSCH by using the SUL carrier 2 704 or the UL CC 1 702 of FIG. 7, or determining the presence of a bit field of a UL/SUL indicator when transmitting a PUSCH by using the SUL carrier 1 802 of FIG. 8 will be described.

First Embodiment

When the UE is configured with both the UL CC 1 702 and the Supplementary UL carrier 2 704 (i.e., the UE is configured with both UL and SUL) and the number of bits of DCI format 1_0 before zero padding is performed is greater than the number of bits of DCI format 0_0 before zero padding is performed, the UE may determine that a 1-bit UL/SUL indicator field is included in DCI format 0_0. In this regard, the UE may determine that the UL/SUL indicator field is located in a last bit after DCI format 0_0 is padded to match the number of bits of DCI format 1_0.

Otherwise (i.e., when the UE is not configured with SUL, when the UE is configured only with SUL without UL as described with reference to FIG. 8, when the UE is configured with SDL and SUL in one cell as described with reference to FIG. 8, or when the UE is configured with both UL and SUL, but is configured with PUSCH transmission by using only a PUCCH transmission carrier, as described with reference to FIG. 7), the UE may determine that the UL/SUL indicator field is not present in DCI format 0_0, that a 0-bit UL/SUL indicator field is present in DCI format 0_0, or that a UL/SUL indicator field, which corresponds to a last bit after DCI format 0_0 is padded, is reserved and not used.

As described above, when the UE determines that the UL/SUL indicator field is present in DCI format 0_0 and the UE is not configured with pusch-Config, the UE may ignore an indication indicated by the UL/SUL indicator field, and transmit a PUSCH scheduled by using DCI format 0_0 in a UL carrier (UL or SUL) configured to transmit a PUCCH in pucch-Config.

When the UE determines that the UL/SUL indicator field is not present in DCI format 0_0, that a 0-bit UL/SUL indicator field is present in DCI format 0_0, or that a UL/SUL indicator field, which corresponds to a last bit after DCI format 0_0 is padded, is reserved and not used, the UE may transmit a PUSCH scheduled by using DCI format 0_0 in a UL carrier (UL or SUL) configured to transmit a PUCCH in pucch-Config.

Second Embodiment

When the UE is configured with both the UL CC 1 702 and the SUL carrier 2 704 (i.e., the UE is configured with both an UL and a SUL), the UE may determine that a 1-bit UL/SUL indicator field is present in DCI format 0_1. Otherwise (i.e., when the UE is not configured with SUL, when the UE is configured only with SUL without UL as described with reference to FIG. 8, when the UE is configured with SDL and SUL in one cell as described with reference to FIG. 8, or when the UE is configured with both UL and SUL, but is configured with PUSCH transmission by using only a PUCCH transmission carrier, as described with reference to FIG. 7), the UE may determine that the UL/SUL indicator field is not present in DCI format 0_1, that a 0-bit UL/SUL indicator field is present in DCI format 0_1, or that the UL/SUL indicator field is reserved and not used.

In the 5G or NR communication systems according to an embodiment of the disclosure, when a SUL carrier is bundled with a single NR cell to configure one cell, or is bundled with a SDL carrier to configure one cell, a method of configuring a bit field of a DL control channel according to a cell configuration scheme may be described. Also, as a UE receives the DL control channel and performs UL data transmission by using a particular UL carrier, data transmission/reception according to a cell configuration scheme may be efficiently performed.

Figure 9:
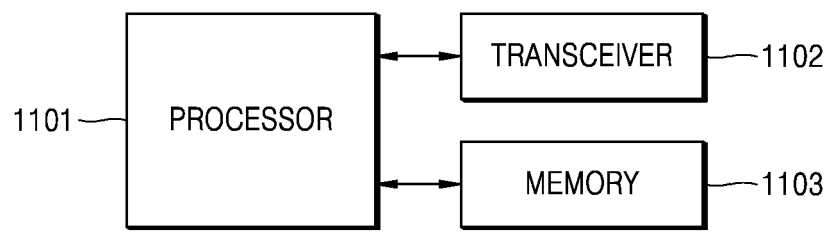
FIG. 9 illustrates a user equipment according to an embodiment.
Figure 10:
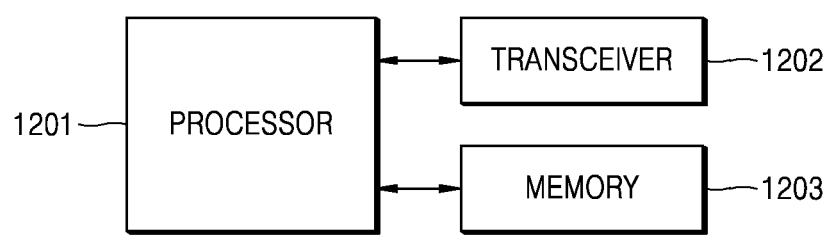
FIG. 10 illustrates a base station according to an embodiment.

A transmitter, a receiver, and a controller of each of a UE and a BS for performing the aforementioned embodiments of the disclosure are exemplarily illustrated in FIGS. 9 and 10. In the 5G or NR communication systems according to an embodiment of the disclosure, a method of activating/inactivating a SUL carrier when performing UL transmission by using the SUL carrier may be provided. Also, a method, performed by a BS and a UE, of transmission/reception will be described, to which a method is applied of enabling efficient data transmission/reception through aperiodic transmission/reception of channel information by indicating a particular DL carrier for aperiodic transmission/reception of channel information when the SUL carrier is configured and activated. In order to perform this, a transmitter, a receiver, and a processor of each of the BS and the UE may each operate according to embodiments.

FIG. 9 illustrates a UE according to an embodiment. Referring to FIG. 9, the UE may include a processor 1101, a transceiver 1102, and a memory 1103. The transceiver 1102, the memory 1103, and the processor 1101 of the UE may operate according to the aforementioned communication method of the UE. However, elements of the UE are not limited to the aforementioned examples. For example, the UE may include more elements than the aforementioned elements or may include fewer elements than the aforementioned elements. Furthermore, the transceiver 1102, the memory 1103, and the processor 1101 may be implemented as a single chip.

The processor 1101 may control a series of processes that the UE may operate according to the aforementioned embodiments of the disclosure. For example, when performing UL transmission according to an embodiment of the disclosure, the processor 1101 may differently control operations including determining whether a SUL carrier and a UL carrier (i.e., an UL CC) are configured, determining whether a UL/SUL indicator is present in a UL DCI format, or transmitting a PUSCH in a particular UL carrier based on the presence of the aforementioned UL/SUL indicator and a bit field of the UL/SUL indicator.

The transceiver 1102 may transmit and receive a signal to and from a BS. The signal may include control information and data. To this end, the transceiver 1102 may include a radio frequency (RF) transmitter that up-converts and amplifies a frequency of a signal to be transmitted and an RF receiver that low-noise-amplifies and down-converts a frequency of a received signal. However, this is only an embodiment of the transceiver 1102, and the elements of the transceiver 1102 are not limited to the RF transmitter and the RF receiver.

Also, the transceiver 1102 may receive a signal via a wireless channel and output the signal to the processor 1101, and may transmit a signal output from the processor 1101 via a wireless channel.

The memory 1103 may store programs and data that are required for operations of the UE. The memory 1103 may also store control information or data included in a signal obtained by the UE. The memory 1103 may include a storage medium such as read-only memory (ROM), random access memory (RAM), hard-disk, compact disc (CD)-ROM, digital versatile disc (DVD), etc., or a combination thereof. Furthermore, the memory 1103 may include a plurality of memories. In an embodiment, the memory 1103 may store programs for supporting beam-based cooperative communication.

FIG. 10 is a block diagram of an internal structure of a BS, according to an embodiment. Referring to FIG. 10, the BS may include a processor 1201, a transceiver 1202, and a memory 1203. However, elements of the BS are not limited to the aforementioned examples. For example, the BS may include more elements than the aforementioned elements or may include fewer elements than the aforementioned elements. Furthermore, the transceiver 1202, the memory 1203, and the processor 1201 may be implemented as a single chip.

The processor 1201 may control a series of processes so that the BS operates according to the aforementioned embodiments of the disclosure. In an embodiment, when performing UL transmission according to an embodiment of the disclosure, the processor 1201 may differently control operations including determining configurations of a SUL carrier and a UL carrier, determining whether a UL/SUL indicator is present in a UL DCI format, or transmitting a PUSCH in a particular UL carrier based on the presence of the aforementioned UL/SUL indicator and a bit field of the UL/SUL indicator.

The transceiver 1202 may transmit and receive a signal to and from a UE. The signal may include control information and data. To this end, the transceiver 1202 may include an RF transmitter that up-converts and amplifies a frequency of a signal to be transmitted and an RF receiver that low-noise-amplifies and down-converts a frequency of a received signal. However, this is only an embodiment of the transceiver 1202, and the elements of the transceiver 1202 are not limited to the RF transmitter and the RF receiver.

Also, the transceiver 1202 may receive a signal through a wireless channel and output the signal to the processor 1201, and may transmit a signal output from the processor 1201, through a wireless channel.

The memory 1203 may store programs and data that are required for operations of the BS. The memory 1203 may also store control information or data included in a signal obtained by the BS. The memory 1203 may include a storage medium such as ROM, RAM, hard-disk, CD-ROM, DVD, etc., or a combination thereof. Also, the memory 1203 may include a plurality of memories. In an embodiment, the memory 1203 may store programs for supporting beam-based cooperative communication.

The methods according to the embodiments of the disclosure described in the claims or specification of the disclosure may be implemented in hardware, software, or a combination of hardware and software.

When the methods are implemented in software, a computer-readable storage medium or a computer program product storing at least one program (e.g., a software module) may be provided. The at least one program stored in the computer-readable storage medium or the computer program product may be configured for execution by at least one processor in an electronic device. The at least one program may include instructions that cause the electronic device to execute the methods according to the embodiments of the disclosure described in the claims or specification thereof.

The programs (e.g., software modules or software) may be stored in RAM, a non-volatile memory including a flash memory, ROM, electrically erasable programmable ROM (EEPROM), a magnetic disc storage device, CD-ROM, DVD, other types of optical storage devices, or a magnetic cassette. Alternatively, the programs may be stored in a memory that is configured as a combination of some or all of the memories. Also, each of the memories may include a plurality of memories.

Furthermore, the program may be stored in an attachable storage device that may be accessed through communication networks such as the Internet, Intranet, a local area network (LAN), a wide LAN (WLAN), or a storage area network (SAN) or a communication network configured in a combination thereof. The storage device may access a device performing the embodiments of the disclosure via an external port. Further, a separate storage device on the communication network may also access the device performing the embodiments of the disclosure.

In the aforementioned embodiments of the disclosure, an element or elements included in the disclosure are expressed in a singular or plural form depending on the described embodiments of the disclosure. However, singular or plural expressions are selected appropriately for the presented situations for convenience of description, and the disclosure is not limited to the singular or plural form. An element expressed in a singular form may be configured as a plurality of elements, and elements expressed in a plural form may be configured as a single element.

It should be understood that the embodiments of the disclosure in the specification and drawings should be considered in a descriptive sense only and not for purposes of limitation. That is, it will be understood by one of ordinary skill in the art that various changes in form and details may be made based on the technical concept of the disclosure. Also, the embodiments may be combined and used as needed. Further, the embodiments may be applied to other systems, e.g., an LTE system, 5G or NR systems, etc.

What is claimed is:

1. A method performed by a user equipment (UE) in a wireless communication system, the method comprising:
   receiving, from a base station, ServingCellConfig including at least one of configuration information of an uplink (UL) or configuration information of a supplementary UL (SUL);
   receiving, from the base station, downlink control information (DCI) format 0_1 for a physical UL shared channel (PUSCH), wherein a UL/SUL indicator in the DCI format 0_1 is 0 bit, in case that the UE is configured with the SUL without the UL; and
   transmitting, to the base station, the PUSCH on the SUL based on the UL/SUL indicator being 0 bit in the DCI format 0_1.

2. The method of claim 1, wherein the UL and the SUL associated with the DCI format 0_1 are included in one cell.

3. The method of claim 1, further comprising:
   receiving random access channel (RACH) configuration including a threshold for selection of the SUL;
   measuring reference signal received power (RSRP); and
   selecting the SUL for a random access, in case that the measured RSRP is less than the threshold.

4. A user equipment (UE) in a wireless communication system, the UE comprising:
   a transceiver; and
   at least one processor coupled with the transceiver, the at least one processor is configured to:
      receive from a base station, ServingCellConfig including at least one of configuration information of an uplink (UL) or configuration information of a supplementary UL (SUL),
      receive from the base station, downlink control information (DCI) format 0_1 for a physical UL shared channel (PUSCH), wherein a UL/SUL indicator in the DCI format 0_1 is 0 bit, in case that the UE is configured with the SUL without the UL, and
      transmit to the base station the PUSCH on the SUL based on the UL/SUL indicator being 0 bit in the DCI format 0_1.

5. The UE of claim 4, wherein the UL and the SUL associated with the DCI format 0_1 are included in one cell.

6. The UE of claim 4, wherein the at least one processor is configured to:
   receive random access channel (RACH) configuration including a threshold for selection of the SUL,
   measure reference signal received power (RSRP), and
   select the SUL for a random access, in case that the measured RSRP is less than the threshold.

7. A method performed by a base station in a wireless communication system, the method comprising:
   transmitting, to a user equipment (UE), ServingCellConfig including at least one of configuration information of an uplink (UL) or configuration information of a supplementary UL (SUL);
   transmitting, to the UE, downlink control information (DCI) format 0_1 for a physical UL shared channel (PUSCH), wherein a UL/SUL indicator in the DCI format 0_1 is 0 bit, in case that the UE is configured with the SUL without the UL; and
   receiving, from the UE, the PUSCH on the SUL based on the UL/SUL indicator being 0 bit in the DCI format 0_1.

8. The method of claim 7, wherein the UL and the SUL associated with the DCI format 0_1 are included in one cell.

9. The method of claim 7, further comprising transmitting random access channel (RACH) configuration including a threshold for selection of the SUL.

10. A base station in a wireless communication system, the base station comprising:
    a transceiver; and
    at least one processor coupled with the transceiver, the at least one processor is configured to:
       transmit to a user equipment (UE), ServingCellConfig including at least one of configuration information of an uplink (UL) or configuration information of a supplementary UL (SUL),
       receive from the base station, downlink control information (DCI) format 0_1 for a physical UL shared channel (PUSCH), wherein a UL/SUL indicator in the DCI format 0_1 is 0 bit, in case that the UE is configured with the SUL without the UL, and
       transmit to the base station the PUSCH on the SUL based on the UL/SUL indicator being 0 bit in the DCI format 0_1.

11. The base station of claim 10, wherein the UL and the SUL associated with the DCI format 0_1 are included in one cell.

12. The base station of claim 10, wherein the at least one processor is configured to transmit random access channel (RACH) configuration including a threshold for selection of the SUL.

* * * * *